Patented Dec. 12, 1922.

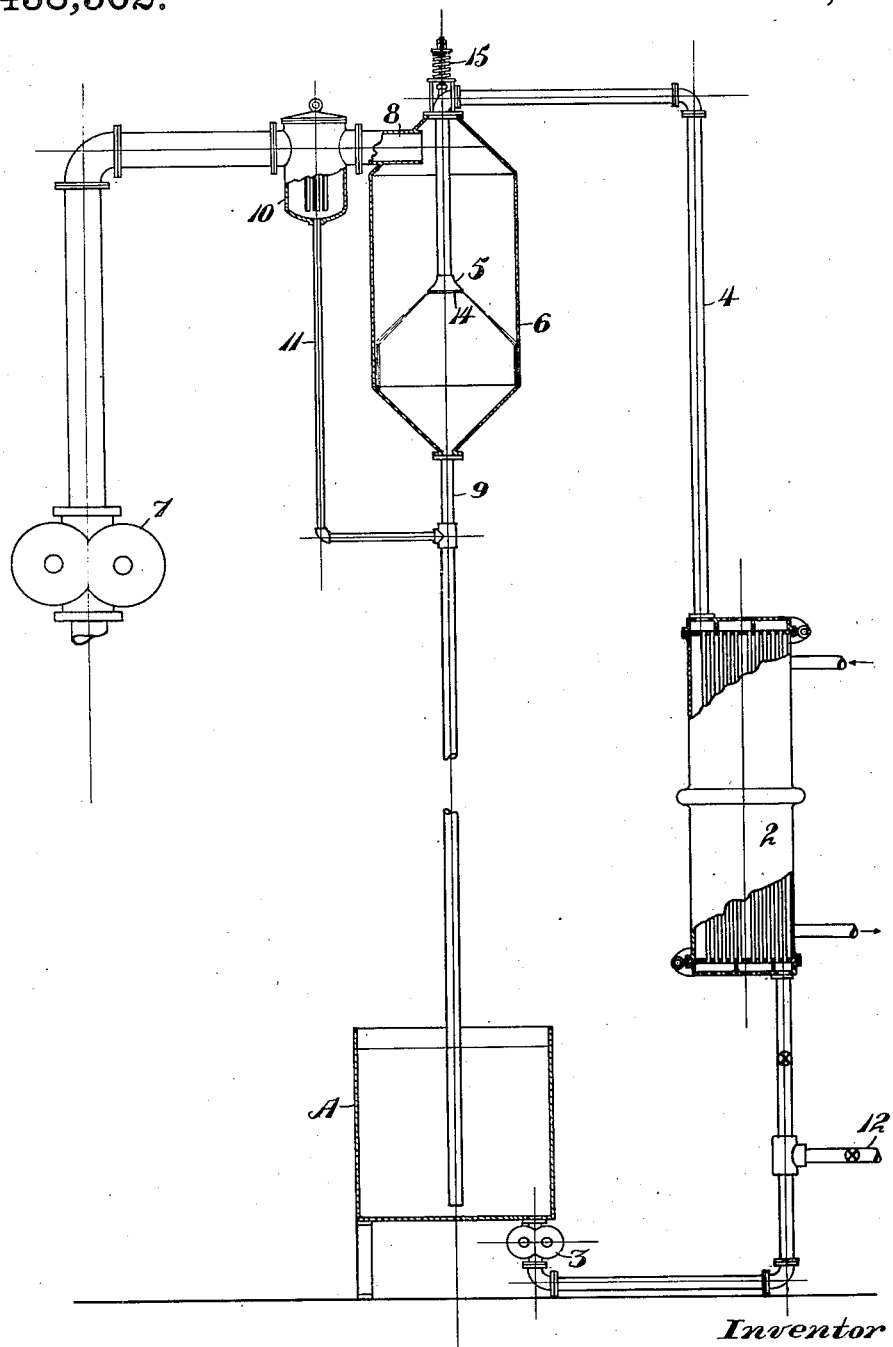

1,438,502

UNITED STATES PATENT OFFICE.

DAVID D. PEEBLES, OF EUREKA, CALIFORNIA, ASSIGNOR TO BAIR, PEEBLES & TOOBY, OF EUREKA, CALIFORNIA, A COPARTNERSHIP CONSISTING OF FRED S. BAIR, DAVID D. PEEBLES, GEORGE T. TOOBY, AND FRANK H. TOOBY.

METHOD OF CONCENTRATING LIQUIDS CONTAINING ORGANIC MATTER.

Application filed October 30, 1918. Serial No. 260,228.

*To all whom it may concern:*

Be it known that I, DAVID D. PEEBLES, a citizen of the United States, residing at Eureka, in the county of Humboldt and State of California, have invented new and useful Improvement in Methods of Concentrating Liquids Containing Organic Matter, of which the following is a specification.

This invention relates to the dehydration, condensation and concentration of liquids, and pertains especially to the concentration of milk.

In practice it has been general to effect concentration or dehydration of milk commercially by the so-called vacuum pan system to which there are various objections including: the initial expense of installation; the tendency of the liquors foaming and priming and being carried over with the vapor escaping from the pan, resulting in serious loss; adhesion of the concentrated material to the heated surfaces of the pan, thereby resulting in scorching and injury besides otherwise detrimentally affecting the concentration; the need of special apparatus for homogenizing the milk; the need of a pre-heater before the milk goes into the pan; the inflexibility of the process by reason of the fixed ratio that temperature bears to vacuum; the practical necessity of maintaining a high temperature in the vacuum pan to prevent incubation of the bacteria, thereby breaking down the chemical constituents of the original milk; and finally the necessity of separate sterilizing apparatus at destructively high temperatures.

The object of the present invention is to overcome the foregoing difficulties by a simple, practical cyclical process, in which the concentration of the milk is carried to any desired degree without material loss of the milk values by evaporation, and in which process the heating, sterilizing, evaporation, condensation and re-circulation are essentially carried on at temperatures either above or below incubating temperatures, and at temperatures at which the milk is not detrimentally affected. In short, the practical embodiment of the process brings about a concentrated milk product in which bacterial growth has been destroyed or arrested, the milk has longer keeping qualities and the product possesses the original flavor of the natural milk, a desideratum which has hitherto not been possible by any known process.

Generally speaking, the invention comprehends essentially the continuous and successive circulation of the milk through the heater and thence into and through an expansion chamber, and then back into the heater until the desired degree of concentration has been effected; maintaining the temperature in the heater at such a point that the heat is raised sufficiently above the incubating temperature of the bacteria contained in the milk, this temperature above which the bacteria will germinate being a temperature that is destructive to the bacteria; maintaining this high temperature for only a relatively brief period of time, so that the milk will not be detrimentally affected in its chemical or physical constituency but will acquire the desired heat head for the next step, which is: the delivery of the heated milk into the expansion chamber wherein is maintained a sufficiently high vacuum to remove the moisture by explosive effect so that the moisture in the bacteria suddenly expands, thereby disrupting the bacteria. The release of the milk into the vacuum chamber also immediately chills the milk, below the temperature at which germination of bacteria is promoted, or at least at which lower temperature in the vacuum expansion chamber germination is greatly retarded. The milk after passing through the vacuum chamber is shortly returned to the heater and raised to a relatively high temperature again, so that at no period during the cycle does the milk remain at such a temperature as permits material development of the bacteria.

Before passing on to a description of the process in detail, certain general principles recognized in the evaporation or condensation of milk may be mentioned. It is frequently stated that milk must not be heated over 165° F. as at this temperature the albumen has a tendency to coagulate and the flavor of the milk is materially injured. The effect that this or any other temperature has on the milk depends, of course, in a large measure on the length of time that the milk is maintained at this particular temperature. The object of heating the milk to 165° F. or thereabouts is, of course, to effect pasteurization. It is also desirous not to keep the milk at a temperature of from 100° F. to 135° F. for any considerable length of time as at this temperature the bacteria present in the milk germinate very rapidly; the rapidity of germination, of course, depending on the degree of the temperature, and the length of time, and the character of the bacteria, as some bacteria germinate more rapidly at one temperature than at another.

Again, in any vacuum system the temperature maintained in the vacuum depends on the degree of vacuum. For instance, a 26 inch vacuum has a relative temperature of approximately 124° F.; a 28 inch vacuum has a relative temperature of approximately 100° F.; and a 29 inch vacuum has a relative temperature of approximately 78° F.; hence the higher the vacuum the lower the temperature it is possible to operate under.

From the foregoing enunciated principles it will be obvious that in a vacuum pan system most of the operations are carried on under ideal temperatures for bacteria germination.

In my system the milk is alternately heated, as will be seen, to approximately 160° F., which is a pasteurizing temperature, and then cooled to the temperature of the vacuum under which the concentrator is operating, so that any bacterial growth that is in the milk will not have time to germinate before the milk again reaches a higher temperature and said bacterial growth is destroyed.

The drawing illustrates an apparatus such as has been used and is used by me in the practice of my process.

A represents a suitable reservoir or tank in which the milk to be treated is first placed. 2 is a tubular heater through which the milk is circulated under pressure and at appropriate high velocity from the tank A by a pressure pump 3, of any appropriate design. From the heater the heated milk passes by a conduit 4 and discharges through a spray nozzle 5 into an evaporating and expansion chamber 6; the chamber 6 being evacuated of its air and gas so as to maintain a suitable high degree of vacuum therein through the medium of a vacuum pump 7, which is connected by a pipe 8 near the top of the chamber 6 and above the spray nozzle 5.

The chamber 6 is connected by a barometric column 9 with the reservoir A for the re-delivery into the latter of the return liquid from chamber 6. 10 is a separator positioned in the vacuum line 8 and having a return connection 11 back into the barometric column 9 for re-delivery into the system of any milk that may be carried by entrainment over from the vacuum chamber. The concentrated liquid from the evaporator, after re-delivery into the tank A, is re-circulated through the system and the cycle is repeated until a suitable degree of concentration and viscosity of the liquor under treatment is reached, when it is discharged from the line through the pipe 12. Such is, briefly, the cycle of operation.

In practice I employ a heater of the tubular type, in which the milk is circulated through the tubes and brought to the desired temperature; time, temperature and velocity being related and important factors in this particular step of the process.

In the evaporating chamber the degree of vacuum and the manner in which the milk is sprayed into the evaporating chamber are likewise important factors. It is essential that the pre-heated milk be sprayed into the expansion chamber in a downward direction or at least in a direction counter to the flow of the vapors leaving the expansion at 8; the milk spray impinging against the sides of the expansion chamber thus rupturing whatever bubbles may be formed and allowing the liquor to flow downward along the sides of the expansion chamber in a thin film. The surface tension of the liquor prevents it being picked up by the vapors leaving it.

While any suitable character of spray nozzle may be employed, I prefer to use a bell-shaped outer casing with a spring seated conical spreader 14; the spring 15 being tensioned so that the valve may open to admit a thin conoidal film of milk and spray it within the chamber under the pressure of the milk current passing through the heater.

*High velocity in the heater.*—This is a very essential feature. In practice I maintain a velocity through the heater in excess of four feet per second for the purpose of preventing the milk from becoming scorched, increasing the efficiency of the heater and preventing encrustation of the tubes by milk deposit. With a smaller tube perhaps a slightly slower velocity would be permitted. The temperature on the tubes in the heater varies from 212° F. to 230° F. The milk, however, passing through this heated zone is driven at such a velocity that it does not rise above 160° F., a suitable pasteurizing temperature.

*Violent evaporation in the expansion chamber under heat head.*—The rapid fall of temperature below the pasteurizing temperature of 160° F. (approximately) takes place in the expansion chamber apparently in the form of an explosion. This lower temperature in the expansion chamber will be the temperature of the vacuum therein maintained; for instance, operating with a 28 inch vacuum is approximately a temperature of 100° F. A 29 inch vacuum would give approximately a temperature of 78° F.; the lower the temperature in the expansion chamber the more rapid the evaporation, the more violent the explosion, the more effective the sterilizing effect due to the disrupting of the bacteria, and the greater the thermal efficiency.

The theory that I advance for disrupting the bacteria by spraying under the circumstances herein mentioned is that the organisms, in order to germinate, must contain moisture, and as they are sprayed through the nozzle under a heat head into the lower temperatures of the vacuum there is a very rapid and violent expansion of the moisture within these organisms, exactly the same character of expansion as occurs in the opening of a blow-off from a boiler or even a boiler explosion itself. It is this rapid expansion of the moisture within the organisms which disrupts the latter, and once this is done they will not further germinate.

The velocity at which the milk is delivered to the heater is immaterial. It is very material, though, the ratio that velocity bears to temperature of the heater in passing through the heater, so that the milk is intermittently affected and yet it is heated to a pasteurizing degree, and also that the heat head is supplied for evaporation. The passage of the milk from its pasteurizing temperature to a zone of temperature below the ideal germinating limits must be rapid so as not to give the bacteria any material chance to germinate in the transition from the higher to the lower temperatures. In practice, the milk is circulated through the apparatus over and over again until the desired degree of concentration is reached; the degree of the concentration being limited only by the degree of viscosity capable of being handled by the pump.

It will be manifest that by this process the milk at all times is kept thoroughly homogenized.

Having thus described my invention, what I claim and desire to secure by Letters Patent is—

1. The process of concentrating liquid containing organic matter which consists of continuously and successively circulating the liquid through a heater and thence into an expansion chamber in which a high degree of vacuum is maintained, the ratio of the velocity of the liquid containing organic matter passing through the heater and the temperature in the heater being such that the liquid containing organic matter is subjected only momentarily to a temperature whereby it absorbs sufficient heat to effect subsequent vaporization and to effect pasteurization, spraying the heated liquid containing organic matter suddenly and by pressure into the expansion chamber, withdrawing the vapors and liquid containing organic matter separately from the expansion chamber without access of air, and recirculating the partially concentrated liquid containing organic matter from the expansion chamber through the heater and expansion chamber until the desired degree of concentration is obtained.

2. The method of concentrating milk which consists in the continuous and successive circulation of the milk through a heater under pressure and an expansion chamber closed against access of surrounding air, the temperature of the milk being alternately suddenly raised in the heater above the temperature at which germination of the active organisms within the milk takes place and suddenly reduced in the expansion chamber to a temperature below that at which such germination is active, and removing the vapors resulting from the expansion of the water of the milk in the expansion chamber separately from the milk, whereby at each successive cycle a percentage of dehydration is effected, and the milk is condensed and made more sterile without altering its chemical composition.

3. The method of concentrating liquid containing organic matter which consists in repeatedly circulating the liquid containing the matter from and to a source of supply, momentarily passing the liquid containing the material at each cycle of circulation through a heater sufficiently hot to raise the temperature of the liquid not to exceed approximately 170° F. to momentarily give the liquid containing the organic matter the desired heat, then quickly discharging the heated liquid containing the organic matter in a vacuum chamber before the high temperature detrimentally affects the organic matter.

4. The method of concentrating liquid containing organic matter which consists in repeatedly circulating the liquid containing the organic matter from and to a source of supply through a heater at approximately four feet per second, maintaining the heater at a temperature to momentarily heat the liquid containing the organic matter up to a temperature not to exceed approximately its pasteurizing temperature, then quickly passing the liquid containing the organic matter into an expansion chamber wherein is maintained a low enough vacuum to give explosive evaporation to the liquid to reduce it considerably below its pasteurizing temperature before the higher temperature to which the liquid containing the organic matter has been heated, has had time to effect any deleterious change in the quality of the material being concentrated and separating the vapor from the condensed liquid.

5. The method of concentrating liquid containing organic matter which consists in passing the liquid from a source of supply through conduits closed to the outer air, momentarily passing the liquid through a heater sufficiently hot to raise the temperature of the liquid not to exceed 170° F. then quickly passing the liquid into an expansion chamber where a vacuum is maintained sufficiently low to produce explosive evaporation thereby immediately lowering the temperature of the liquid before the high temperature detrimentally affects the organic matter, removing the vapor from the vacuum chamber through one conduit and conducting the concentrated liquid containing the organic matter through a different conduit to the original source of supply and repeating the operation until the desired concentration is effected.

In testimony whereof I have hereunto set my hand in the presence of two subscribing witnesses.

DAVID D. PEEBLES.

Witnesses:
JOHN H. HERRING,
W. W. HEALEY.